(12) United States Patent
Betz et al.

(10) Patent No.: US 7,702,719 B1
(45) Date of Patent: Apr. 20, 2010

(54) METHODS AND APPARATUS FOR REDUCING THE NUMBER OF SERVER INTERACTIONS IN NETWORK-BASED APPLICATIONS USING A DUAL-MVC APPROACH

(75) Inventors: Katherine Betz, Hopewell Junction, NY (US); Avraham Leff, New Hempstead, NY (US); James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 09/500,208

(22) Filed: Feb. 8, 2000

(51) Int. Cl.
G06F 15/16 (2006.01)

(52) U.S. Cl. .................. 709/203; 709/201; 709/205; 709/217; 709/223

(58) Field of Classification Search ......... 709/201–203, 709/205, 217–219, 223, 224; 715/733, 747
See application file for complete search history.

(56) References Cited

U.S. PATENT DOCUMENTS

| | | | | |
|---|---|---|---|---|
| 5,572,643 A | * | 11/1996 | Judson | 709/218 |
| 5,768,510 A | * | 6/1998 | Gish | 709/218 |
| 5,838,906 A | * | 11/1998 | Doyle et al. | 709/202 |
| 5,926,177 A | * | 7/1999 | Hatanaka et al. | 715/747 |
| 6,003,047 A | * | 12/1999 | Osmond et al. | 715/513 |
| 6,035,332 A | * | 3/2000 | Ingrassia et al. | 709/218 |
| 6,151,621 A | * | 11/2000 | Colyer et al. | 709/217 |
| 6,161,136 A | * | 12/2000 | Hyndman et al. | 709/223 |
| 6,170,019 B1 | * | 1/2001 | Dresel et al. | 709/330 |
| 6,272,556 B1 | * | 8/2001 | Gish | 709/315 |
| 6,356,933 B2 | * | 3/2002 | Mitchell et al. | 709/203 |
| 6,393,569 B1 | * | 5/2002 | Orenshteyn | 709/203 |
| 6,437,803 B1 | * | 8/2002 | Panasyuk et al. | 715/733 |
| 6,496,202 B1 | * | 12/2002 | Prinzing | 715/762 |
| 6,505,246 B1 | * | 1/2003 | Land et al. | 709/224 |
| 6,950,850 B1 | * | 9/2005 | Leff et al. | 709/203 |
| 6,968,534 B1 | * | 11/2005 | Hayase | 717/105 |

FOREIGN PATENT DOCUMENTS

| | | |
|---|---|---|
| JP | 10-207805 | 8/1998 |
| JP | 10-303893 | 11/1998 |
| JP | 10-320390 | 12/1998 |
| JP | 11-003237 | 1/1999 |
| JP | 11-031145 | 2/1999 |
| JP | 11-031155 | 2/1999 |
| JP | 11-338888 | 12/1999 |

OTHER PUBLICATIONS

G.E. Krasner and S.T. Pope, "A Cookbook for Using the Model-View-Controller User Interface Paradigm in SmallTalk-80," Journal of Object-Oriented Programming, 1(3):26-49, Aug./ Sep. 1988.

* cited by examiner

Primary Examiner—Ramy Mohamed Osman
(74) Attorney, Agent, or Firm—Kenneth R. Corsello; Ryan, Mason & Lewis, LLP

(57) ABSTRACT

In accordance with a dual-MVC (Model-View-Controller) approach of the invention, the client machine maintains part of the Model, eliminating many round-trips to the server. The invention provides an implementation approach for constructing the frame(s) contained in the client's browser software to allow it to be refreshed locally. The invention addresses development and maintenance by specifying a library of functions that a programmer can use to construct the View and Controller on the client machine. When part of the Model is maintained on the client, the client has the ability to respond to user interaction without paying the performance penalty of continually interacting with the server.

26 Claims, 12 Drawing Sheets

FIG. 5

| ID | NAME | PHONE | OPERATING SYSTEM | REMARKS |
|---|---|---|---|---|
| 1234567 | John Smith | (914) 222-7890 | NT ▷ | ◁▷ |

ADD ANOTHER PROBLEM

SAVE

| VERSION |
| PLATFORM |
| HOST NAME |
| IP ADDRESS |

FIG. 9A

```
<SCRIPT LANGUAGE="JavaScript">

// Define the variable (s) holding the Model data
var   counter = 0;   // a counter value // Define the variables holding pointers to the View components
var   theFrame;        // pointer to the LFrame component
var   theForm;         // pointer to the LForm component
var   theText;         // pointer to the LText component
var   theButton;       // pointer to the LButton component
var   theStaticText;   // pointer to the LStaticText component function initialize ( )  //  Create and initialize components
{

// Create a library LFrame component
   theFrame = new parent.LIBFrame.LFrame ("Frame1", "A Frame");

// Adjust the base font to be +3 larger
   theFrame.adjustBaseFont (+3);

// Create a library LForm component inside the LFrame
   theForm = new parent.LIBFrame.LForm ("Form1", theFrame);

// Create a library LText (text entry field) component inside the LForm
   theText = new parent.LIBFrame.LText ("foo", "bar", theForm);

// Set up an event handler to handle user changes to the LText
   the Text.setOnChange (T_onChange);

//Create a library LButton component inside the LForm
   theButton = new parent.LIBFrame.LButton ("increment_button",
        "Increment Counter", theForm);

// Set an event handler to handle clicks on the LButton
   theButton.setOnClick (B_increment);
```

(CONTINUED IN FIG. 9B)

FIG. 9B (CONTINUED FROM FIG. 9A)

```
// Create a library LStaticText (label) component in the LForm
theStaticText = new parent.LIBFrame.LStaticText ("OST", "piece of text ...",
    theForm);

// Set the font size for the LStaticText
theStaticText.setFontSize (1);

//Set the color for the LStaticText
theStaticText.setColor ("red");

// Refresh the contents of the User Interaction window
theFrame.RefreshVisibleFrame ();

// Set the browser focus to be on the LText component
theText.focus ();
}

// This function is invoked on the LText component when the value is changed
// by a user interaction
function T_onChange ()
{
  // Change the value to a message
  this.setValue ("Please do not change the value!");
}

// This function is invoked on the LText object when the user clicks on it
```

(CONTINUED IN FIG. 9C)

FIG. 9C (CONTINUED FROM FIG. 9B)

```
function T_onClick ()
{
  this.setValue ("Please do not click on this!");
}

// This function is invoked on the LButton object when the user clicks on it
function B_increment ()
{
  // Increment the counter (Model)
  counter += 1;

// Move the new counter value into the LText field
  theText.setValue (counter);

// Increment the font size on the LStaticText component
  theStaticText.setFontSize (theStaticText.getFontSize() + 1);

// Toggle the LStaticText component font between Courier and Impact
  if (0 == (counter % 2))
     theStaticText.setFace ("Courier");
  else
     theStaticText.setFace ("Impact");
}

</SCRIPT>
```

METHODS AND APPARATUS FOR REDUCING THE NUMBER OF SERVER INTERACTIONS IN NETWORK-BASED APPLICATIONS USING A DUAL-MVC APPROACH

FIELD OF THE INVENTION

The present invention is related to network-based client/server applications and, more particularly, to methods and apparatus for reducing the number of server interactions in world wide web-based applications using a dual Model-View-Controller approach.

BACKGROUND OF THE INVENTION

Typical world wide web (e.g., Internet/Intranet) applications allow users to access and update data on remote servers. The remote server contains the master application data and the client displays views of this data. Examples of such applications include a help desk, life insurance underwriting, health insurance pre-certification for medical procedures, and automated teller machines.

Historically (circa 1970), applications executed on large mainframe systems (servers), to which clients connected via "dumb terminals," e.g., Teletypes, DEC VT100, IBM 327x-series terminals, etc. In these architectures, very little processing was done on the client side. Subsequently (circa 1980), as hardware became cheaper, some of the processing was moved to the client-side hardware, in so-called "fat-client" architectures. A fat client maintains some of the application state, enabling some processing to occur locally thus eliminating round-trips to the server.

Fat-client applications can be described in terms of the MVC (Model-View-Controller) paradigm. The MVC paradigm is described, for example, in G. E. Krasner and S. T. Pope, "A Cookbook for Using the Model-View-Controller User Interface Paradigm in SmallTalk-80," Journal of Object-Oriented Programming, 1(3):26-49, August/September 1988, the disclosure of which is incorporated herein by reference. In this paradigm, the "Model" contains the data, rules, and algorithms affecting the data. The "View" is a screen or window representation of a subset of the model that the application chooses to display. The "Controller" is the logic that processes user requests, such as pressing a button. The Controller causes the Model to be changed and/or the View to be refreshed.

Fat-client applications may maintain a Model and Controller on the server but never maintain a View or View Generation Logic (VGL) on the server. Instead, View and VGL are maintained solely by the fat client.

While fat-client applications provided improved response time, the distribution and maintenance of the client software and databases was problematic. Users tended to customize their client system, and this made it difficult to develop a client-side software base that would work properly on all systems. In addition, when the client software needed to be updated, a company had to figure out how to update all the client machines in the field.

Applets (see http://java.sun.com/applets/index.html) are one implementation of the fat-client architecture. When the user starts the application, or while running the application, the server downloads part of the application to the client's machine to execute locally. This improves performance because round-trips to the server are lessened. However, when the applet is first invoked, it must be downloaded to the client, which in practice can take a significant length of time.

Also, in practice, web browsers often support different levels of Java Virtual Machines (JVMs). Because an applet is interpreted by the JVM, the difference in JVMs causes inconsistent operation of applets on different browsers or even different versions of the same browser.

More recently (circa 1994), the development and popularization of the world wide web has led towards a so-called "thin-client" application architecture. In this architecture, most of the application logic again executes on the server, with only the browser display logic, i.e., application-independent display logic, executing inside the client-side web browser software. Here the browser is the client, and displays a View. Each time the user interacts with the View, the remote server is notified to update the View and/or Model.

Another implementation of client/server interaction over the web uses Dynamic HyperText Markup Language (DHTML). DHTML is described, for example, in D. Goodman, "Dynamic HTML, The Definitive Reference," O'Reilly, 1998, the disclosure of which is incorporated herein by reference. DHTML is a superset of HTML (HyperText Markup Language) which includes JavaScript and Cascading Style Sheets (CSS). JavaScript can be used to implement much of the same functionality that applets provide, is in practice more portable between browsers, and is quicker to download.

Although fat-client architectures provide the most flexibility and performance, their maintenance and distribution problems, together with the popularity of the web, have led many application developers to adopt thin-client architectures for new applications. A problem with this architecture is that network communication delays during server interactions again lead to reduced performance.

Therefore, a need exists for a new Model-View-Controller architecture for Internet/Intranet applications which does not require continual network communication between the client and server.

SUMMARY OF THE INVENTION

The invention relates to web applications and, more particularly, to an architecture and method of programming which improves performance and eases the development and maintenance effort. The invention addresses performance by employing a dual-MVC approach, in which a subset of the application's Model-View-Controller reside on the client, and the full Model-View-Controller and View-Generating-Logic reside on the server, thereby reducing the number of required server interactions. In contrast to the fat-client architecture, the invention does not require any application installation or persistence on the client.

More specifically, the classic fat-client implementation requires that the user (or administrator) physically install the client software on the client machine, and the application will require the long-term use of persistent storage (i.e., disk space) on the client machine. For example, consider the well-known tax preparation assistance software program known as "TurboTax" as a fat-client application. A CDROM is required to run the install process. After installation, the program uses a sizable amount of disk space, both for its own program/data files and for the user's tax return. From time to time, e.g., during electronic filing of a tax return, "TurboTax" interacts with a remote server as a (fat) client.

The applet approach avoids some of the problems of fat clients, because the applet is downloaded automatically and does not make long-term use of disk space. However, the applet may take a long time to download, and it is difficult in practice to write an applet which will function correctly on every client.

The dual-MVC approach of the invention avoids the installation and disk-space problems because client-side code associated with the MVC of the application is preferably downloaded from the server on demand by the user of the client device, avoiding the install process, and is preferably not saved permanently to the disk of the client. The dual-MVC approach also avoids problems associated with applets because the MVC code downloaded according to the invention is physically smaller than an applet and thus results in a faster download. Also, the dual-MVC approach of the invention preferably uses HTML and JavaScript constructs which are, in practice, more portable between browsers than are applets.

Particularly, in accordance with the unique dual-MVC approach of the invention, the client machine maintains part of the Model, eliminating many round-trips to the server. The invention provides an implementation approach for constructing the frame(s) contained in the client's browser software to allow it to be refreshed locally. The invention addresses development and maintenance by specifying a library of functions that a programmer can use to construct the View and Controller on the client machine. When part of the Model is maintained on the client, the client has the ability to respond to user interaction without paying the performance penalty of continually interacting with the server.

It is to be appreciated that the term "frame" as used herein has a similar usage as in HTML. Web browsers typically display one or more windows on the client's screen. Each window may correspond to one HTML frame, or may instead correspond to one HTML "frameset." A frameset comprises one or more frames, which are like sub-windows inside a frameset window.

The invention specifies a way to structure browser-based clients so that classic MVC interactions are possible. The client's browser screen may be divided into multiple frames. In the case of a web browser running at the client, the web browser includes an HTML frameset. There may be one or more visible frames that the user interacts with, and a number of "invisible" frames where the logic resides. By "invisible" frame, we mean that the frames height or width has been set to a very small value, so that they appear not to occupy any screen area. Visible frames obviously occupy some screen area. The invisible frames contain the application logic and the logic to rewrite the visible frames. It is to be appreciated that an application may create additional windows or framesets, and/or have additional frames within a window, where the window corresponds to a frameset. Without this invention, a client-side application attempting to update its View will destroy itself by overwriting its own Controller logic and Model data.

It is to be appreciated that the term "logic" as used herein is intended to refer to program code, preferably in JavaScript at the client side, although it may also be in Java, VBScript, C++, C, or any other programming language which is supported by the browser.

The invention also specifies a way to program this kind of web application. Programmers using only the dual-MVC and multiple frames will need to generate HTML within their View-generating logic. This requires the programmer to think in two different domains simultaneously: JavaScript for the View-generating logic, Model, and Controller, and HTML for the View itself. This may be a complicated, tedious, and error-prone task depending on the application being designed. To substantially eliminate this situation, the present invention specifies a library of functions that are capable of writing the HTML with JavaScript. The programmer can implement the application using these functions rather than having to write the complicated HTML/JavaScript. This is analogous to programmers writing user interfaces using the Java Swing library.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating a second display screen associated with an exemplary application;

FIGS. 9A through 9C depict code fragments illustrating a sample application using a library frame according to an embodiment of the present invention.

DETAILED DESCRIPTION OF PREFERRED EMBODIMENTS

The following description will illustrate the invention using an exemplary web-based client/server system. It should be understood, however, that the invention is not limited to use with any particular client/server system. The invention is instead more generally applicable to any network-based client/server system in which it is desirable to substantially reduce server interactions on the part of the client when executing one or more applications associated with the server.

Figure 1:
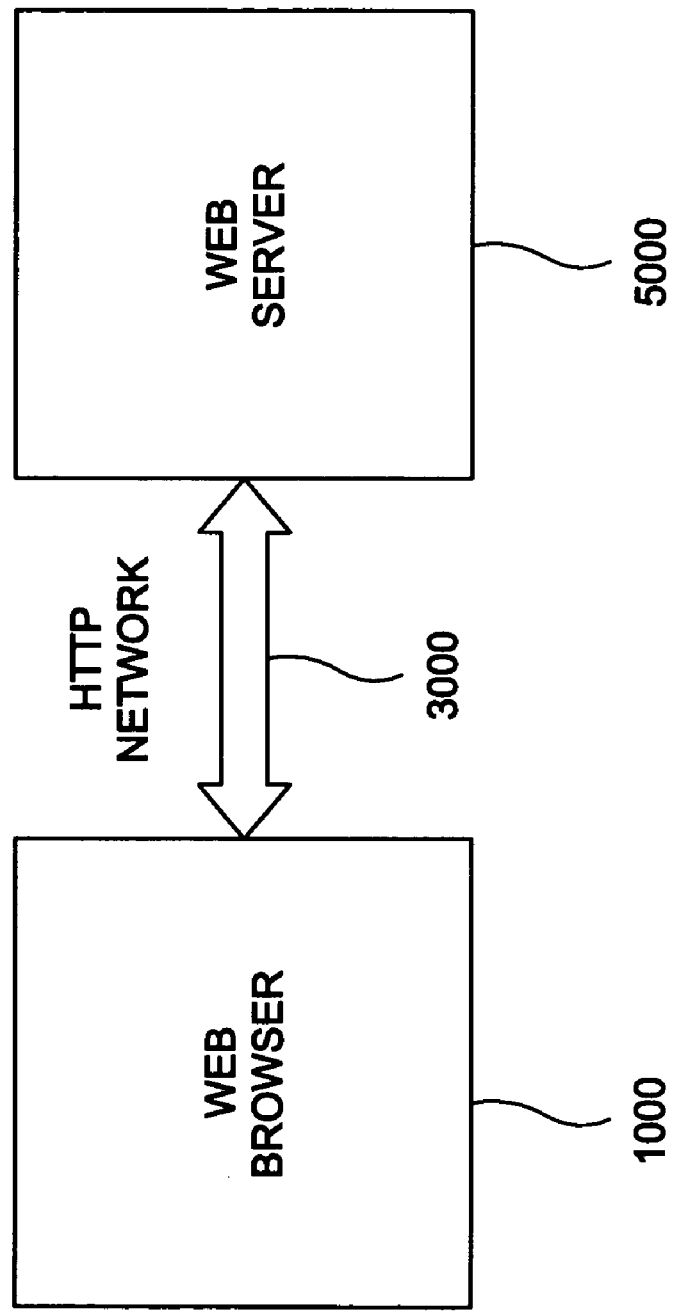
FIG. 1 is a block diagram illustrating an exemplary client/server system suitable for employing the present invention.

FIG. 1 is a block diagram illustrating an exemplary client/server system suitable for employing the present invention. The system comprises a client computer system which is configured to run web browser software 1000. It is to be appreciated that any suitable web browser software may be employed and that the methodologies of the invention are not limited to any particular web browser software. Further, as shown in the client/server system of FIG. 1, the web browser 1000 communicates over a network 3000 with a web server 5000. The network 3000 may employ a HyperText Transport Protocol (HTTP), as is well known in the art and as is implemented in accordance with the world wide web, however, other suitable protocols and networks may be employed. For example, the client and server may alternatively be connected via a private network, a local area network, or some other suitable network.

It is to be appreciated that an example of such a client/server system as illustrated in FIG. 1 may include an arrangement wherein a user at a personal computer or workstation (client) accesses a particular application (e.g., help desk, life insurance underwriting, health insurance pre-certification for medical procedures, and automated teller machines) associated with a particular server on the HTTP network in accordance with web browser software loaded and running on the client machine.

Figure 2:
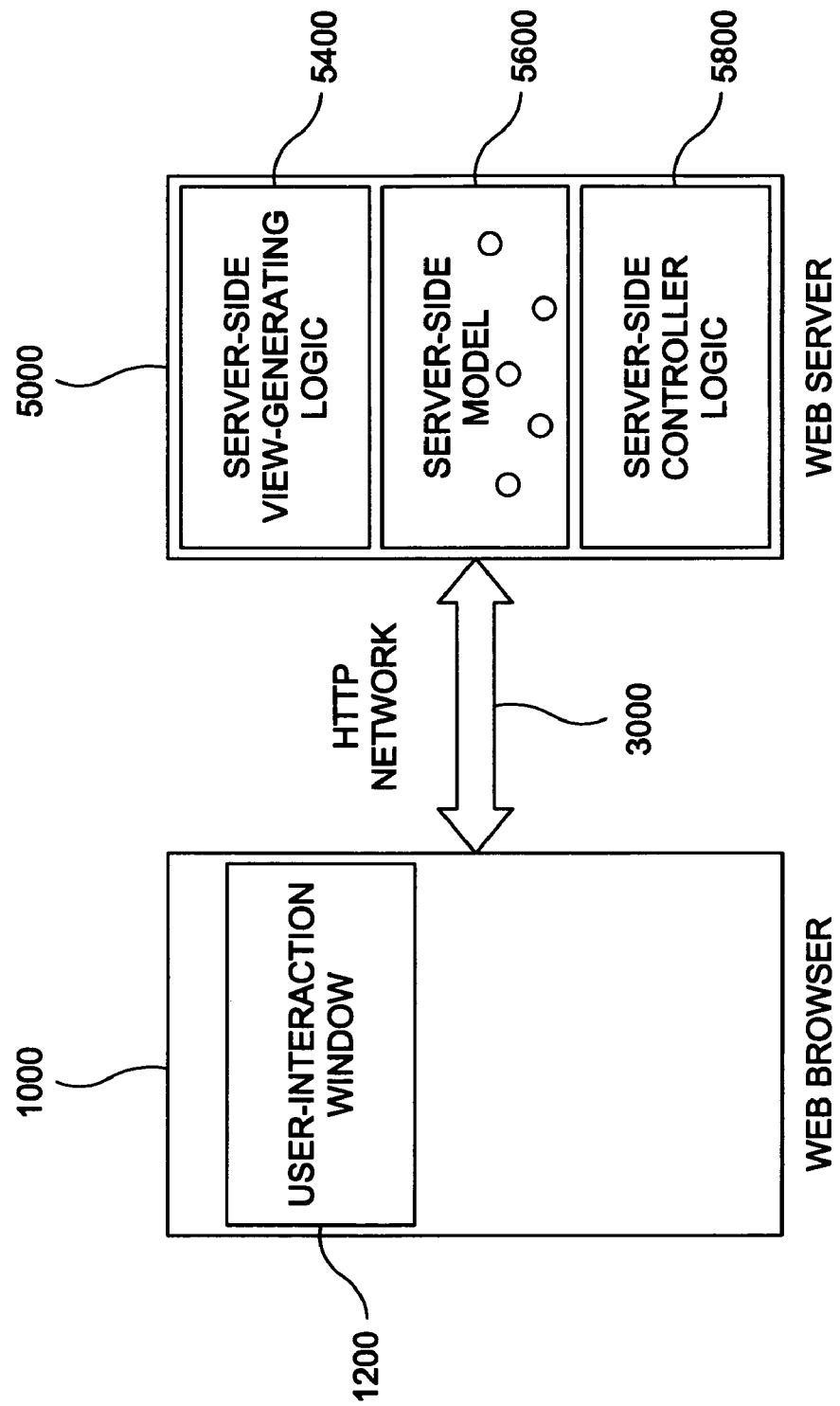
FIG. 2 is a block diagram illustrating a conventional thin-client architecture.

FIG. 2 illustrates a block diagram of a conventional thin-client architecture as may be implemented in a web browser 1000 and server 5000. In this architecture, the application's view-generating logic 5400, Model 5600, and Controller 5800 reside entirely on the server 5000. The client's browser contains the user-interaction window 1200.

Figure 3:
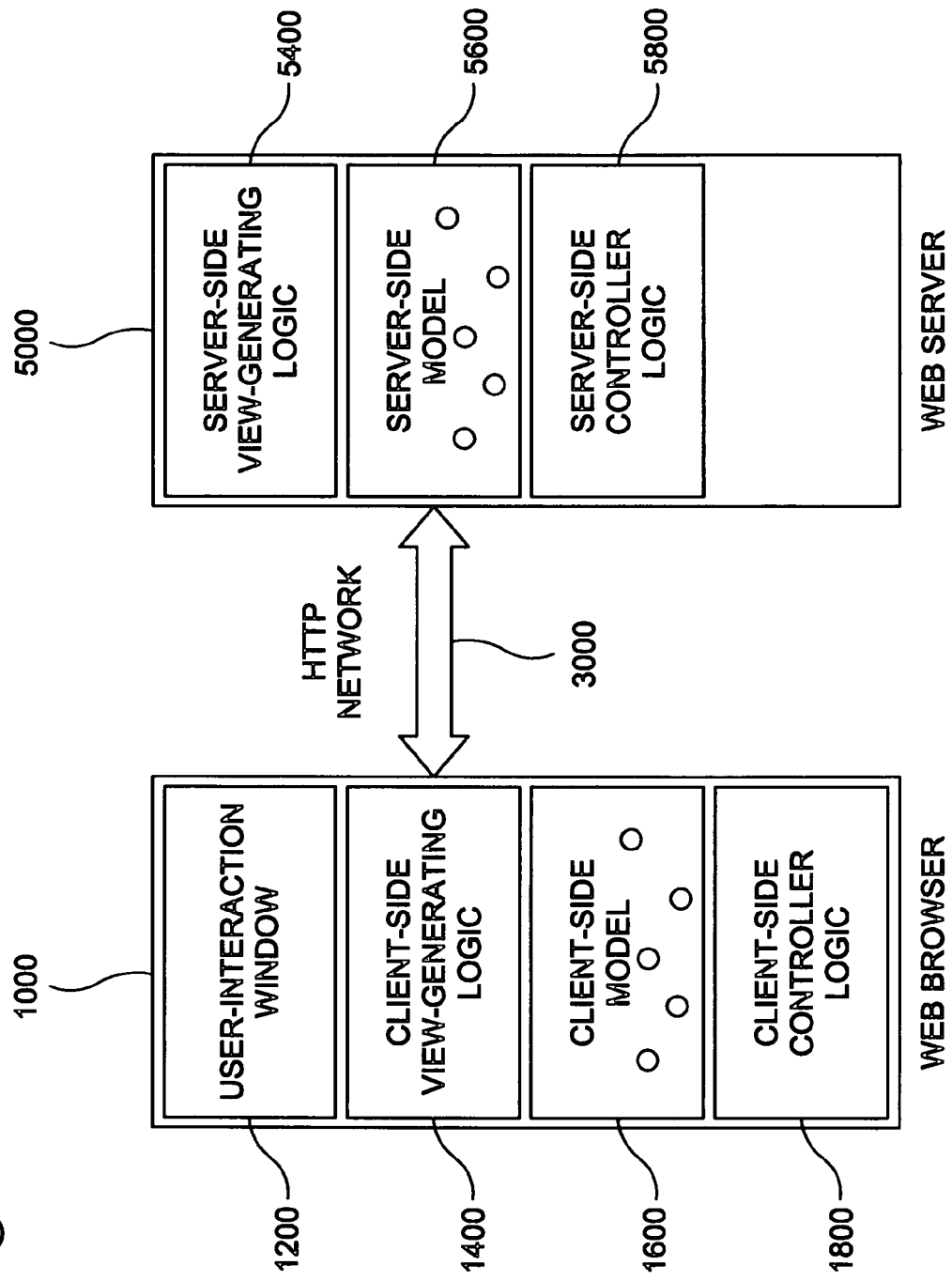
FIG. 3 is a block diagram illustrating a dual-MVC architecture according to an embodiment of the present invention.

In contrast, referring now to FIG. 3, a block diagram illustrating a dual-MVC architecture according to an embodiment of the present invention is shown. In this architecture, the web server 5000 comprises Model-View-Controller components, including server-side View-generating logic 5400, server-side Model data 5600 and server-side Controller logic 5800. The web browser (client) 1000 comprises a user-interaction window 1200, client-side View-generating logic 1400, client-side Model data 1600 and client-side Controller logic 1800. These MVC components are preferably downloaded to the client from the server at the time that the client requests use of the application at the server. Given the fact that the client and server both contain MVC components, we term this approach dual-MVC.

Figure 4:
FIG. 4 is a diagram illustrating an initial display screen associated with an exemplary application.

A principal advantage of our invention is a dramatic improvement in application response time, since many interactions with the server are eliminated. To demonstrate the performance improvement which may be achieved, a help desk application will be described. In accordance with such a help desk application, a computer user (i.e., customer) may have problems with his/her computer and call technical support. The person providing the help (i.e., consultant) has a web application to record information about the customer and his/her problem. In other words, a help desk consultant sits in front of a web-based user interface and uses the interface to communicate with the help desk server in order to record and track a customer's problems which he/she reports during a call to the consultant. In such an example, the computer system with the user interface that the help desk consultant is using is considered the client. Specifically, the consultant utilizes a web browser 1000 (FIG. 3) running on the client to access the help desk server. The help desk server is the server 5000 (FIG. 3). FIG. 4 illustrates an example of the consultant's initial screen, corresponding to the user-interaction window 1200 of FIG. 3. Depending on the operating system selected, a new table is added to the screen to collect operating specific information about the customer's computer. This second screen with the new table is shown in FIG. 5.

Figure 6:
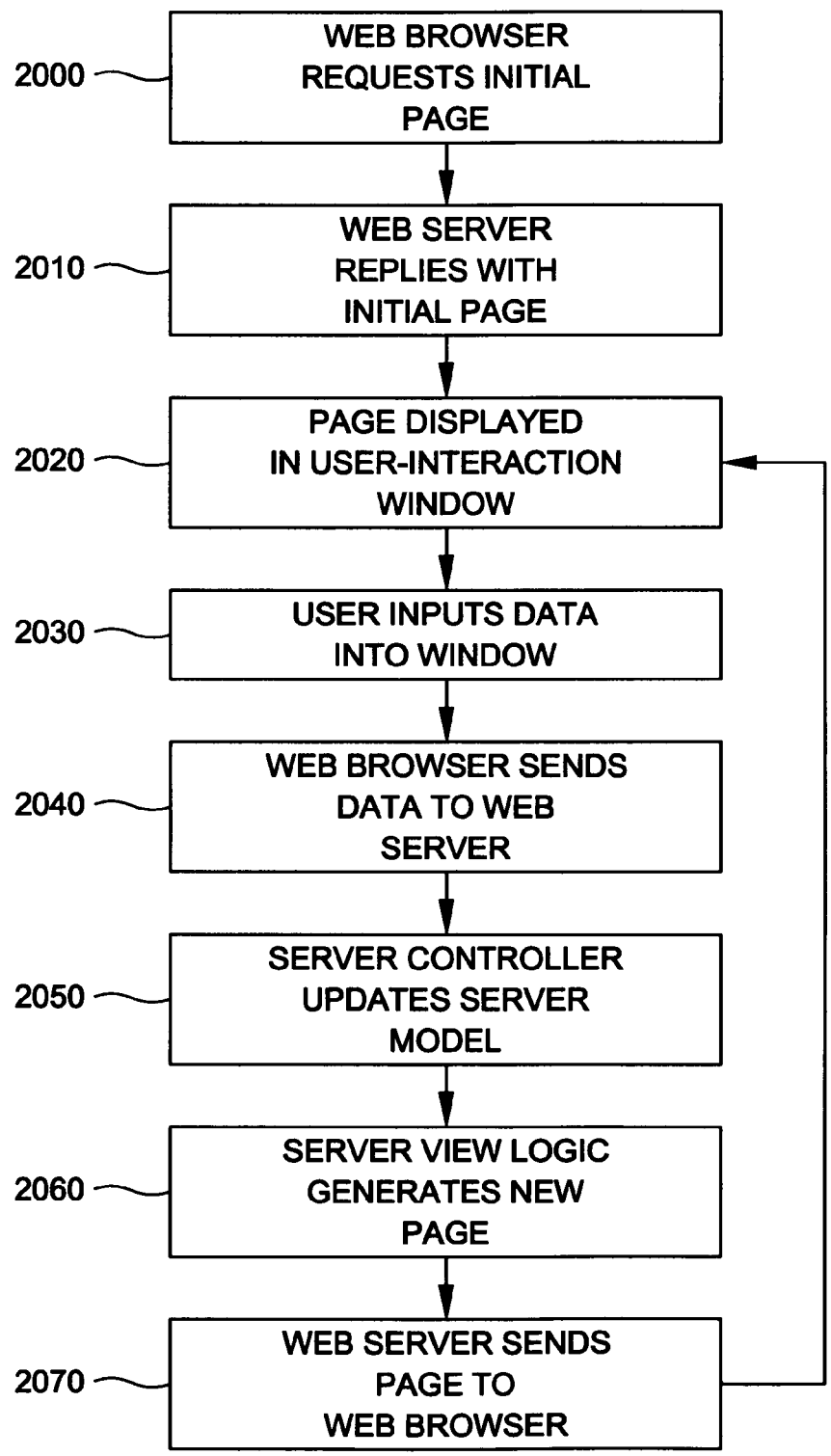
FIG. 6 is a flow diagram illustrating application flow for a conventional thin-client architecture.

We first describe the application flow for an implementation using the conventional thin-client architecture as shown in FIG. 2. FIG. 6 shows a generic application flow for the conventional thin-client architecture. In step 2000, the web browser 1000 requests the initial page from the web server 5000, using the network 3000. In step 2010, the web server replies with the initial page and, in step 2020, the web browser displays the page in the user-interaction window 1200. The user interacts with the displayed page, in step 2030, by inputting data into the window, and the web browser transmits the data back to the web server in step 2040. The server-side controller 5800 updates the server-side model 5600 in step 2050, and the server-side view-generating logic 5400 generates the new page in step 2060. The web server then transmits the new page to the web browser in step 2070, and the flow repeats from step 2020.

Now, referring back to the help desk example illustrated in accordance with FIGS. 4 and 5, and using the conventional thin-client architecture, the following steps would occur:

(1) Consultant asks Customer for identification (ID), and enters it on the view. Browser sends ID to server.
(2) Server validates ID and sends back HTML to refresh the screen with the addition of the customer's name and phone number.
(3) Consultant asks customer for operating system, and enters it (e.g., NT) on the view. Browser sends screen information including operating system type to the Server.
(4) Server sends back HTML to refresh the screen with the addition of the operating system specific table.
(5) Consultant asks customer for operating system-specific information, such as hostname and enters it on the view. Browser sends screen information including hostname to server.
(6) Server finds and returns the IP address corresponding to the hostname.
(7) Consultant clicks on 'Add Another Problem' button. Browser sends screen information including add problem request to server.
(8) Server sends screen with old problem row and additional empty problem row.
(9) Consultant and customer have similar dialog, entering a second problem. Consultant presses Save. Browser sends screen information including save request to server.
(10) Server saves problem reports.

Thus, entering n problem reports disadvantageously requires 3n+1 round-trip interactions between the web browser and the web server.

When a subset of the Model is stored on the client, as in accordance with the dual-MVC approach of the present invention, a number of interactions with the server can be eliminated, thus providing better performance. For example, if the name, ID, phone, operating system, operating system-specific information, and remarks are in the client's model, i.e., are stored at the client, then: (i) the screen can be refreshed with the addition of a blank row; and (ii) the screen can be refreshed by adding the proper operating system table without going to the server.

Figure 7:
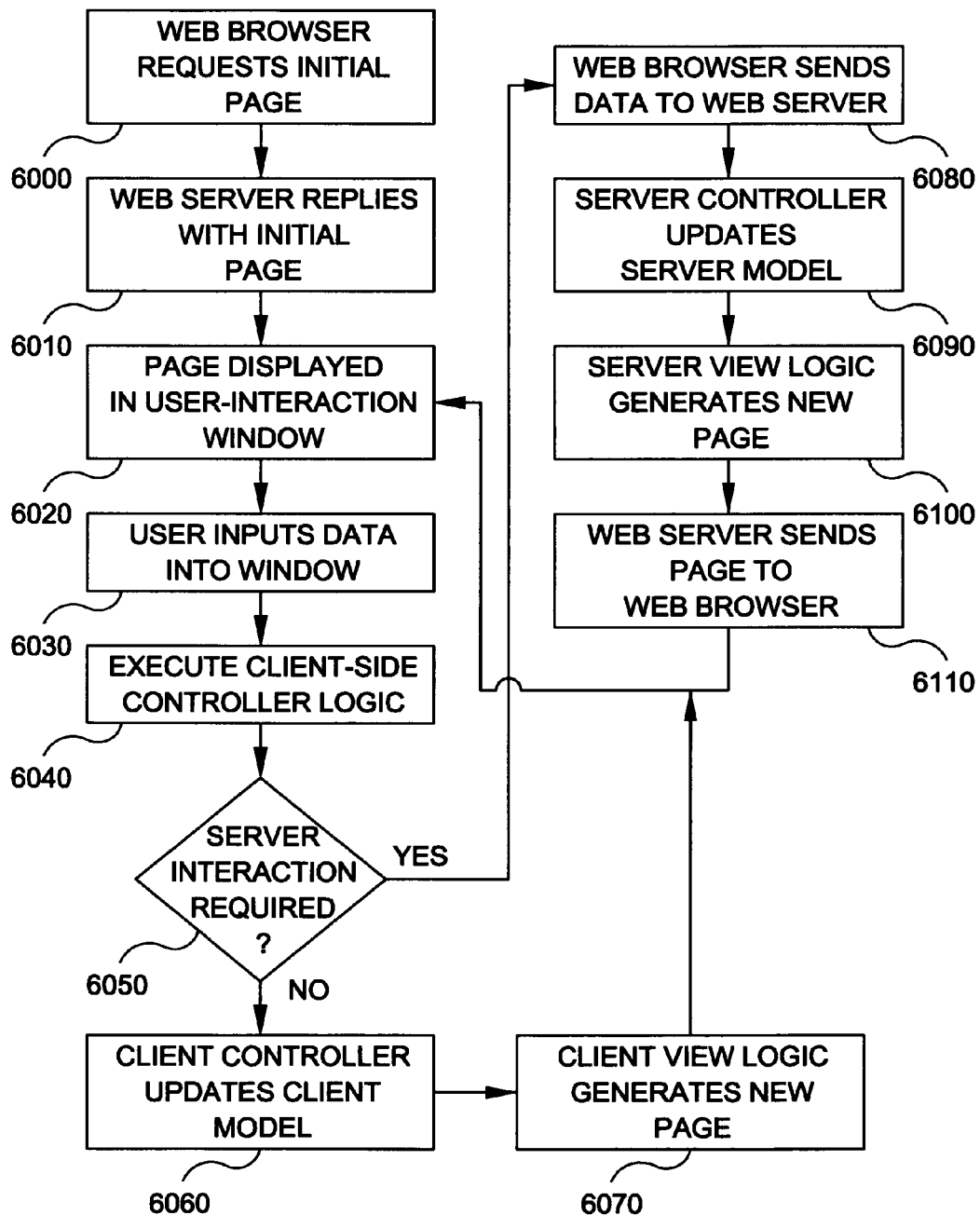
FIG. 7 is a flow diagram illustrating application flow for a dual-MVC architecture according to an embodiment of the present invention.

FIG. 7 shows a generic application flow for a dual-MVC architecture according to the embodiment of the present invention as shown in FIG. 3. In step 6000, the web browser 1000 requests the initial page from the web server 5000, using the network 3000. The web server replies with the initial page in step 6010 and, in step 6020, the web browser displays the page in the user-interaction window 1200. The user interacts with the displayed page, in step 6030, by inputting data into the window. In step 6040, the client-side controller logic 1800 is executed and, in step 6050, determines whether server interaction is required. If server interaction is required, the web browser transmits the data back to the web server in step 6080. The server-side controller 5800 updates the server-side model 5600 in step 6090, and the server-side view-generating logic 5400 generates the new page in step 6100. The web server then transmits the new page to the web browser in step 6110, and the flow repeats from step 6020.

Alternatively, if the client-side logic decides that no server interaction is required, then the client-side model 1600 is updated, in step 6060, to reflect the user's input. Next, the client-side view-generating logic 1400 is executed and generates the new page in step 6070. Returning to step 6020, the page is displayed in the user-interaction window 1200. The application flow then repeats from step 6020.

Assuming that the name, ID, phone, operating system, operating system-specific information, and remarks are contained in the client-side model, the display of FIG. 5 can advantageously be generated without an interaction with the server. Thus, entering n problem reports requires n+2 round-trip interactions between the web browser and the web server using the dual-MVC approach of the present invention. Alternatives for improving performance often involve trade-offs. For example, if performance is critical, and the amount of space on the client"s machine is large enough, more data can be copied to the client. Also, if a list of the hostnames and their corresponding IP addresses is stored on the client, the trip to the server to obtain the IP address given the hostname could also be skipped. If this were done, the number of round-trip interactions would be reduced to two. If a list of customer IDs and their corresponding names and phone numbers is stored on the client, this would eliminate the need to invoke the server to get check the customer ID and return the name and phone. All processing, except for the final save (one interaction), could then be done on the client side.

Figure 8:
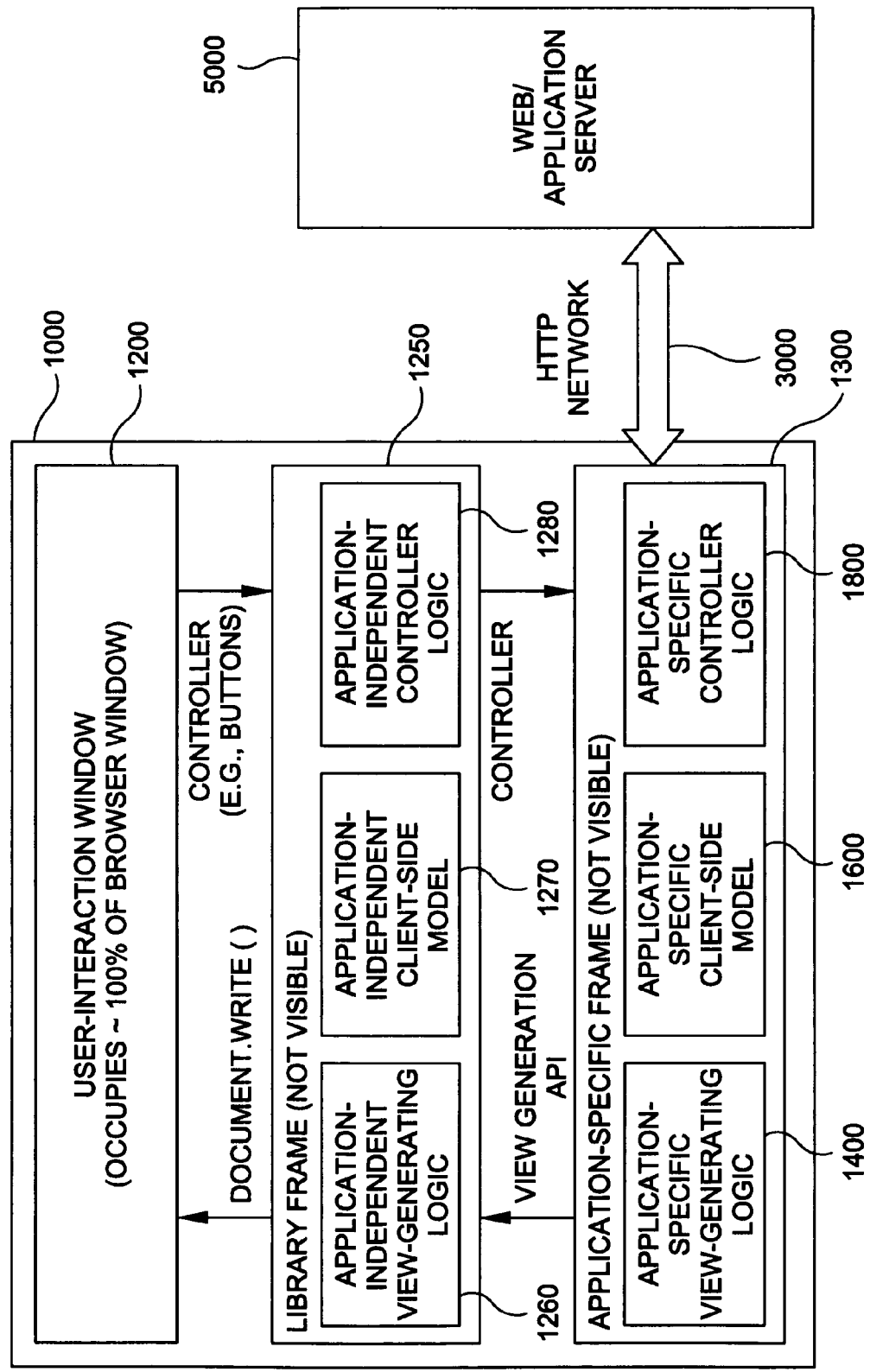
FIG. 8 is a block diagram illustrating a client-side frameset architecture for a dual-MVC approach according to an embodiment of the present invention.

Referring to FIG. 8, a client-side frameset architecture for a dual-MVC approach according to an embodiment of the present invention is shown. Specifically, we specify an illustrative format for the client's browser in order to implement the dual-MVC approach of the invention. The client's browser screen 1000 is divided into multiple frames. There may be one or more visible frames comprising the user-interaction window 1200, an invisible library frame 1250, and an invisible application-specific frame 1300 where the model and logic to write screens resides. The library frame and the application specific frame may also be implemented in multiple frames. In any case, the library frame 1250 contains view-generating logic 1260, client-side model 1270 and controller logic 1280, each of which is independent of the application. The application-specific frame 1300 contains the view-generating logic 1400, client-side model 1600, and controller logic 1800, each of which is specific to the application.

The invention provides a library which is stored in one of the invisible frames. The library allows the developer to program the client's model, view, and controller in a manner where functions are called which are responsible for writing the HTML. This is very complicated and tedious. With the library, the developer's effort is greatly simplified.

The application frame 1300 provides a stable anchor-point for the client-side logic. Since the invention works by rewriting visible frame(s), the visible frames cannot themselves contain controller/view logic and model data, because the logic and data will be destroyed during the rewrite process.

The library frame 1250 provides an application-programming-interface (API) and implementation for generating the view in the visible frame. The API allows the programmer to specify the layout in terms of visible components, with each component having controller properties, e.g., text values, color. The implementation of the components in the library writes the appropriate information into the visible frame (e.g., HTML) to generate the described visual layout. The library frame also contains an application-independent client-side model function 1270, e.g., caching and data-movement operations. Finally, the library frame contains application-independent controller logic 1280, e.g., generic user-interface event handling.

In a preferred embodiment, the application programmer codes the application-specific frame model and controller-logic using JavaScript, and generates the view via calls to the library API. The properties of the view are set from the model and, when instructed to do so by the controller logic, the view renders itself into the visible frame.

Referring now to FIGS. 9A through 9C, code fragments are shown in order to illustrate a sample application using components in a library frame 1250. The application defines a simple Model (a counter value), and a number of library-frame components: (i) an LFrame, a component representing a browser window; (ii) an LForm, a component representing a user-input form in a window; (iii) an LText, a component representing a text-input field in a form; (iv) an LButton, a component representing a pushbutton on which the user may click; and (v) an LStaticText, a component representing a text label on the screen. Each of these components is implemented by code in the library frame 1250. The application-specific frame 1300 makes calls to the library frame 1250 to create components to make callbacks to the application-specific frame 1300 when certain user-input events occur, such as changes to text fields and button presses. During processing of these events, the event handlers in the application-specific frame 1300 may make calls to the components implemented by the library frame 1250 to modify their properties as a result of the user interaction. Of course, it is to be appreciated that the code sample shown in FIGS. 9A through 9C is illustrative in nature and, given the inventive teachings herein, one of ordinary skill in the art will realize various other ways to implement library frames.

Accordingly, as has been explained, the present invention provides for a dual-MVC arrangement (a client-side MVC and a server-side MVC), together with a way of implementing the two MVCs using a standard browser without applets. The invention makes the client-side MVC possible by separating the interaction window 1200 into a separate frame from the application logic (1400, 1800) and model 1600.

Further, the invention provides a client-side application-programming interface (API) for application developers to use when implementing dual-MVC applications. Using this API, which may be implemented in JavaScript, makes it easier to write applications.

Still further, the invention provides for packaging the application-independent code into a separate frame called the library frame 1250. In a preferred embodiment, the library frame contains the application-independent view-generating logic and application-independent controller logic and may contain an application-independent model. For example, it contains the logic to generate a button on the screen, and to receive events caused by clicking the button with a mouse, but does not know where to place the button, what label to place on it, or what application-specific controller action to take when the button is clicked. This is specified by the application-specific components in the application-specific frame 1300. The advantage of the library frame is that the library frame only needs to be downloaded once per browser session, because it changes only when software updates take place (e.g., over weeks or months). The browsers can thus cache the library frame for extended periods. In contrast, the interaction window 1200 is discarded/rewritten on virtually every user interaction, and the application-specific frame 1300 is reloaded on every server interaction. If the code in the library frame were moved to application-specific frame 1300, it would need to be reloaded on every server interaction, which would waste communication bandwidth and cause additional response-time delays.

Figure 10:
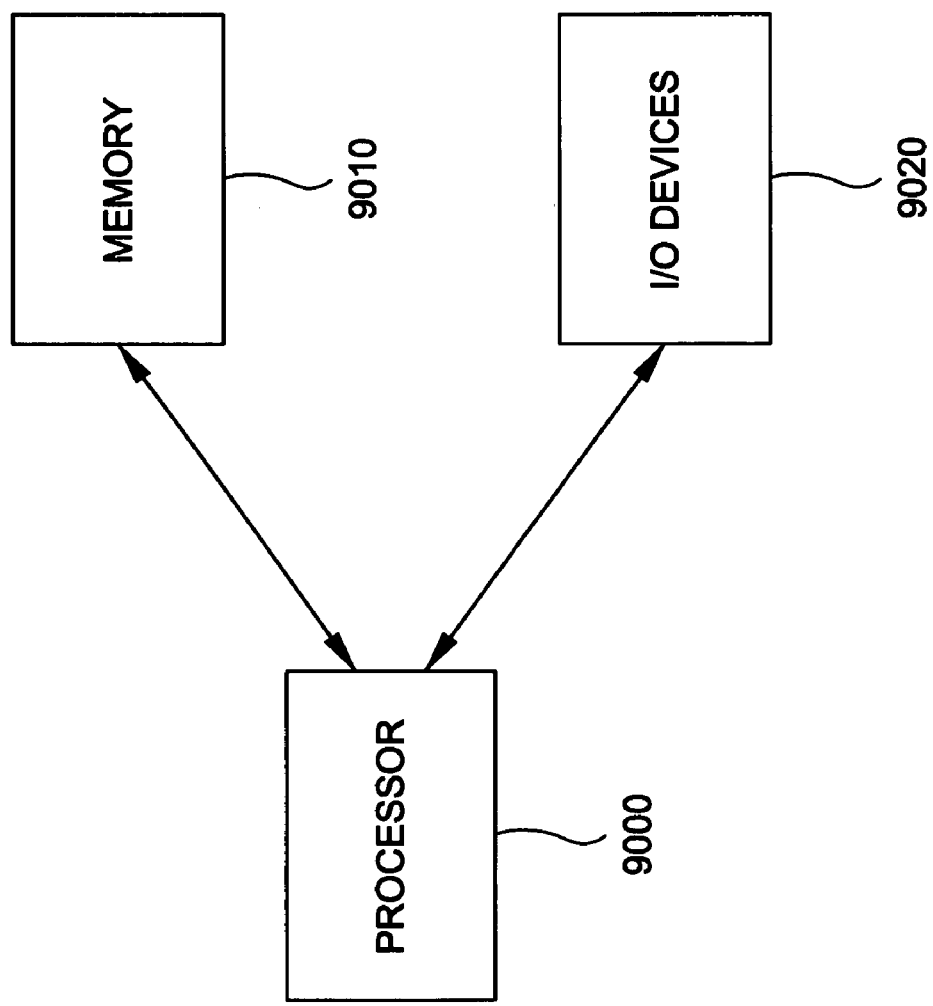
FIG. 10 is a block diagram illustrating a hardware implementation of a client computer system and/or server computer system suitable for implementing the dual-MVC methodologies of the present invention.

Referring now to FIG. 10, a block diagram is shown illustrating a hardware implementation of a client computer system and/or server computer system suitable for implementing the dual-MVC methodologies of the present invention. As shown, both the client system and server system may be implemented in accordance with a processor 9000, a memory 9010 and I/O devices 9020. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. For example, the individual Model, View and Controller logic associated with the client and the server, as shown in FIG. 3, may be implemented in accordance with a hardware architecture as depicted in FIG. 10.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in a client/server system of reducing interactions between a client and server in association with an application being accessed by the client at the server, the method comprising the steps of:
    configuring the server to store a model associated with the application and to execute view-generating and controller logic associated with the application; and
    configuring the client to store at least a subset of the model associated with the application and to execute at least a subset of the view-generating and controller logic associated with the application;
    wherein one or more portions of the application are performed at the client without the client having to interact with the server, and further wherein the client and the server both locally maintain at least a portion of the model and execute the view-generating and controller logic associated therewith.

2. The method of claim 1, wherein the client and server communicate over a HyperText Transport Protocol network.

3. The method of claim 1, wherein the client performs the one or more portions of the application in accordance with browser software running thereon.

4. The method of claim 3, wherein the configuring step further comprises the step of partitioning a screen area associated with the browser software into frames.

5. The method of claim 4, wherein the at least a subset of the model, the view-generating and the controller logic associated with the application are associated with at least one frame and one or more views for display in accordance with the application are associated with at least another frame.

6. The method of claim 5, wherein the at least one view frame is a visible frame.

7. The method of claim 5, wherein the at least one frame associated with the at least a subset of the model, the view-generating logic and the controller logic is not a visible frame.

8. The method of claim 4, wherein the configuring step further comprises forming at least one frame with which application-independent view-generating logic and controller logic is associated.

9. The method of claim 8, wherein the at least one application-independent view-generating logic and controller logic frame further has an application-independent model associated therewith.

10. The method of claim 8, wherein the at least one application-independent view-generating logic and controller logic frame serves as an application programming interface for developing views to be displayed in accordance with the application.

11. The method of claim 10, wherein the views are implemented in accordance with the HyperText Markup Language and the application programming interface is implemented in accordance with the JavaScript language.

12. The method of claim 1, wherein the at least a subset of the model, the view-generating and the controller logic associated with the application are downloaded from the server to the client upon demand.

13. A network-based system, comprising:
    a server having at least one processor operative to: (i) store a model associated with an application associated with the server; and (ii) execute view-generating and controller logic associated with the application; and
    a client, coupled to the server via a network, having at least one processor operative to: (i) store at least a subset of the model associated with the application; and (ii) execute at least a subset of the view-generating and controller logic associated with the application;
    wherein one or more portions of the application are performed at the client without the client having to interact with the server such that interactions between the client and server are reduced, and further wherein the client and the server both locally maintain at least a portion of the model and execute the view-generating and controller logic associated therewith.

14. The system of claim 13, wherein the network is a HyperText Transport Protocol network.

15. The system of claim 13, wherein the client processor performs the one or more portions of the application in accordance with browser software running thereon.

16. The system of claim 15, wherein the client processor is further operative to partition a screen area associated with the browser software into frames.

17. The system of claim 16, wherein the at least a subset of the model, the view-generating and the controller logic associated with the application are associated with at least one frame and one or more views for display in accordance with the application are associated with at least another frame.

18. The system of claim 17, wherein the at least one view frame is a visible frame.

19. The system of claim 17, wherein the at least one frame associated with the at least a subset of the model, the view-generating logic and the controller logic is not a visible frame.

20. The system of claim 16, wherein the client processor is further operative to form at least one frame with which application-independent view-generating logic and controller logic is associated.

21. The system of claim 20, wherein the at least one application-independent view-generating logic and controller logic frame further has an application-independent model associated therewith.

22. The system of claim 20, wherein the at least one application-independent view-generating logic and controller logic frame serves as an application programming interface for developing views to be displayed in accordance with the application.

23. The system of claim 22, wherein the views are implemented in accordance with the HyperText Markup Language and the application programming interface is implemented in accordance with the JavaScript language.

24. The system of claim 13, wherein the at least a subset of the model, the view-generating and the controller logic associated with the application are downloaded from the server to the client upon demand.

25. An article of manufacture for use in a client/server system for reducing interactions between a client and server in association with an application being accessed by the client at the server, comprising machine readable media containing one or more programs which when executed implement the steps of:

configuring the server to store a model associated with the application and to execute view-generating and controller logic associated with the application; and configuring the client to store at least a subset of the model associated with the application and to execute at least a subset of the view-generating and controller logic associated with the application;

wherein one or more portions of the application are performed at the client without the client having to interact with the server, and further wherein the client and the server both locally maintain at least a portion of the model and execute the view-generating and controller logic associated therewith.

26. A method for use in a client/server system of reducing interactions between a client and server in association with an application being accessed by the client at the server, the method comprising the steps of:

configuring the server to: (i) store a model associated with the application; (ii) execute view-generating logic associated with the application; and (iii) execute controller logic associated with the application; and configuring the client to: (i) store at least a subset of the model associated with the application; (ii) execute at least a subset of the view-generating logic associated with the application; and (iii) execute at least a subset of the controller logic associated with the application;

wherein one or more portions of the application are performed at the client without the client having to interact with the server, and further wherein the client and the server both locally maintain at least a portion of the model and execute the view-generating and controller logic associated therewith;

further wherein, in accordance with such a dual model-view-controller arrangement, a model comprises application data, rules, and algorithms affecting the data, a view comprises a screen or window representation of a subset of the model that the application chooses to display, and a controller comprises the logic that processes user requests, and causes the model to be changed and the view to be refreshed.

* * * * *